US007763833B2

(12) United States Patent
Hindel et al.

(10) Patent No.: US 7,763,833 B2
(45) Date of Patent: Jul. 27, 2010

(54) FOIL HEATING ELEMENT FOR AN ELECTROTHERMAL DEICER

(75) Inventors: James T. Hindel, Tallmadge, OH (US); Alan J. Fahrner, Canton, OH (US); James A. Mullen, Akron, OH (US)

(73) Assignee: Goodrich Corp., Charlotte, NC (US)

(*) Notice: Subject to any disclaimer, the term of this patent is extended or adjusted under 35 U.S.C. 154(b) by 319 days.

(21) Appl. No.: 11/078,707

(22) Filed: Mar. 14, 2005

(65) Prior Publication Data

US 2006/0043240 A1 Mar. 2, 2006

Related U.S. Application Data

(60) Provisional application No. 60/552,582, filed on Mar. 12, 2004.

(51) Int. Cl.
*H05B 1/00* (2006.01)

(52) U.S. Cl. ....................... 219/528; 219/532; 219/552; 219/545

(58) Field of Classification Search ................. 219/528, 219/549, 546, 548, 552; 244/206, 204, 209, 244/134 R, 134 B, 134 D, 134 E See application file for complete search history.

(56) References Cited

U.S. PATENT DOCUMENTS

| | | | | |
|---|---|---|---|---|
| 2,152,053 | A * | 3/1939 | Jenkins | 244/204 |
| 2,627,012 | A * | 1/1953 | Kinsella et al. | 244/134 R |
| 3,266,005 | A * | 8/1966 | Balde et al. | 338/308 |
| 3,560,107 | A * | 2/1971 | Helms | 416/90 R |
| 4,036,457 | A | 7/1977 | Volkner et al. | |
| 4,144,473 | A * | 3/1979 | Almer | 313/315 |
| 4,443,735 | A * | 4/1984 | Alexandrov et al. | 313/345 |
| 4,485,297 | A * | 11/1984 | Grise et al. | 219/528 |
| 4,518,851 | A | 5/1985 | Oppitz | |
| 4,533,821 | A | 8/1985 | Sato | |
| 4,581,522 | A | 4/1986 | Graham | |

(Continued)

FOREIGN PATENT DOCUMENTS

GB 2 243 412 10/1991

(Continued)

OTHER PUBLICATIONS

R.E. Evans, D.E. Hall and B.A. Luxon, Nickel Coated Graphite Fiber Conductive Composites, SAMPE Quarterly, vol. 17, No. 4, Jul. 1986.

(Continued)

*Primary Examiner*—Thor S Campbell
(74) *Attorney, Agent, or Firm*—Womble Carlyle

(57) ABSTRACT

An electrical resistance heating element of the sort suitable for use in de-icing an aircraft surface includes a foil patterned with a plurality of holes. The holes are in a first patterned region that extends in a first direction from a first end to an opposite second end. The holes define multiple electrical paths between the two ends. The holes, which may vary in size, are configured and dimensioned such that the multiple electrical paths in areas away from lateral edges of said first patterned region are all non-parallel to the first direction. In other words, the electrical paths do not follow a straight line from the first and second ends, but rather must wend their way around the overlapping holes.

20 Claims, 4 Drawing Sheets

400 408 404 402 420 412 410 A 404

U.S. PATENT DOCUMENTS 4,585,971 A * 4/1986 Clegg ........................ 313/341
4,656,339 A * 4/1987 Grise ........................ 219/528
4,743,740 A 5/1988 Adee
4,814,586 A * 3/1989 Grise ........................ 219/549
4,826,108 A 5/1989 Briscoe et al.
4,837,618 A 6/1989 Hatori et al.
4,892,998 A * 1/1990 Marstiller et al. ........... 219/548
4,906,821 A * 3/1990 Bechevet et al. ............ 219/521
4,942,078 A 7/1990 Newman et al.
4,972,197 A 11/1990 McCauley et al.
5,019,797 A * 5/1991 Marstiller et al. ........... 338/333
5,098,037 A 3/1992 Leffel et al.
5,144,113 A * 9/1992 Hall et al. .................. 219/549
5,248,116 A 9/1993 Rauckhorst
5,344,696 A 9/1994 Hastings et al.
5,361,183 A 11/1994 Wiese
5,427,332 A 6/1995 Rauckhorst, III et al.
5,453,597 A * 9/1995 McWilliams ............. 219/461.1
5,475,204 A 12/1995 Giamati et al.
5,590,854 A 1/1997 Shatz
5,657,951 A 8/1997 Giamati
5,742,223 A * 4/1998 Simendinger et al. ......... 338/21
5,824,996 A 10/1998 Kockman et al.
5,925,275 A 7/1999 Lawson et al.
5,928,549 A * 7/1999 Hitzigrath .................. 219/548
5,934,617 A 8/1999 Rutherford
5,942,140 A 8/1999 Miller et al.
5,947,418 A 9/1999 Bessiere et al.
5,971,323 A 10/1999 Rauch et al.
6,027,075 A 2/2000 Petrenko
6,031,214 A 2/2000 Bost et al.
6,137,083 A 10/2000 Bost et al.
6,145,787 A 11/2000 Rolls
6,194,692 B1 * 2/2001 Oberle ...................... 219/543
6,202,304 B1 3/2001 Shatz
6,237,874 B1 5/2001 Rutherford et al.
6,279,856 B1 8/2001 Rutherford et al.
6,330,986 B1 12/2001 Rutherford et al.
6,338,455 B1 1/2002 Rauch et al.
6,403,935 B2 6/2002 Kockman et al.
6,483,087 B2 11/2002 Gardner et al.
6,521,873 B1 2/2003 Cheng et al.
6,832,742 B2 12/2004 Petrenko et al.
6,870,139 B2 3/2005 Petrenko
6,891,136 B2 * 5/2005 Bikovsky et al. ............ 219/528
7,012,501 B2 * 3/2006 Krumphals et al. ........... 338/21
7,034,257 B2 4/2006 Petrenko
7,211,772 B2 * 5/2007 Carpino et al. .............. 219/528
7,313,947 B2 * 1/2008 Harris et al. ................... 73/86
7,329,843 B2 * 2/2008 Bikhovsky et al. .......... 219/528
2002/0096506 A1 7/2002 Moreland et al.
2002/0153367 A1 10/2002 Haas
2003/0001719 A1 * 1/2003 Schemenaur et al. ........ 338/308
2003/0209534 A1 * 11/2003 Ferguson .................... 219/548
2003/0222077 A1 12/2003 Suda et al.
2003/0234248 A1 12/2003 Kano et al.
2004/0065659 A1 4/2004 Tse
2004/0069772 A1 4/2004 Kondo et al.
2004/0074899 A1 4/2004 Mariner et al.
2005/0006529 A1 1/2005 Moe et al.
2005/0189345 A1 9/2005 Brunner et al.
2005/0194371 A1 * 9/2005 Weinfield et al. ........... 219/428
2006/0032983 A1 2/2006 Brand et al.
2006/0201933 A1 * 9/2006 Carpino et al. .............. 219/545
2007/0164015 A1 * 7/2007 Carpino et al. .............. 219/528
2007/0210073 A1 * 9/2007 Hubert et al. ............... 219/535

FOREIGN PATENT DOCUMENTS

WO WO 2005/020635 3/2005

OTHER PUBLICATIONS

Extended European Search Report dated May 4, 2007, EP 06026086.6—1242.

* cited by examiner

600

700

FOIL HEATING ELEMENT FOR AN ELECTROTHERMAL DEICER

RELATED APPLICATIONS

This application claims priority to U.S. Provisional patent application No. 60/552,582, filed Mar. 12, 2004, the contents of which are incorporated by reference in their entirety.

BACKGROUND OF THE INVENTION

Heaters are used in many applications where heat is required to help warm an adjacent area. Electrothermal deicing is a common way to protect airfoil surfaces from ice accumulation, that is by providing heaters bonded to or integrated within the structure to remove or eliminate ice build-up. It is used wherever icing conditions exist, including applications such as, but not limited to, airfoil leading edges of wings, tails, propellers, helicopter rotor blades, engine inlets, ships, towers, wind turbine blades, and the like, for example. It may also be used in internal areas of an aircraft, examples in areas such as the cockpit cabin or floors for warming, or pipes that may contain liquids that could freeze. In electrothermal deicing systems, heat energy is typically applied to the airfoil surface through a metallic heating element via electrical power supplied by aircraft or appropriate application generators. Typical heating elements are made from foil, wire and metallic-coated fabrics.

Generally, the heating element of an electrothermal deicer should be highly flexible to conform to many types of surface areas and shapes to be ice protected. Such surface areas may be either two- or three-dimensional. In addition, such heating elements should also withstand fatigue and foreign object damage (FOD) requirements for each particular application. Further, such heating elements should be capable of being specifically designed to provide exact power levels (heat) and uniform heat distribution to the protected surfaces which may vary over the airfoil. This allows removal of ice or the prevention of ice while minimizing the power requirements of the electrothermal deicer.

The prior art includes a movable sheet having a rectangular array of perforations and mounted on rollers, as disclosed in U.S. Pat. No. 5,590,854; a grid-type of electrical heating element that is painted on, as disclosed in U.S. Pat. No. 6,027,075, and a mesh of interwoven wire, as disclosed in U.S. Pat. No. 6,832,742. However, most current heater elements are made from a single channel foil or wire element assembly as exemplified by the illustrations of FIGS. 6 and 7, respectively. Accordingly, a failure of a single ribbon via FOD/fatigue in most current heater elements can reduce or eliminate the heating element's usefulness.

SUMMARY OF THE INVENTION

The present invention provides for an aircraft electrothermal deicer heating element. Preferably, the heating element is flexible, can withstand fatigue and foreign object damage (FOD), and can provide exact power levels (heat) and uniform heat distribution to the protected surfaces which may vary over the airfoil.

The present invention is directed to an aircraft electrothermal deicer heating element comprising a foil sheet having a first patterned region that extends in a first direction from a first portion to an second portion, the first patterned region being provided with a plurality of holes defining multiple electrical paths extending from the first portion to the second portion.

In one aspect, the holes are configured and dimensioned such that the multiple electrical paths in areas away from lateral edges of said first patterned region are all non-parallel to said first direction.

In another aspect, the size of the holes may vary.

In yet another aspect, the holes overlap one another in a direction transverse to the first direction such that the first patterned region is devoid of continuous sections of foil material that extend in a straight line between the first and second portion and are parallel to said first direction.

BRIEF DESCRIPTION OF THE DRAWINGS

The invention is now described with respect to the following drawings in which.

DETAILED DESCRIPTION OF THE INVENTION

Figure 1:
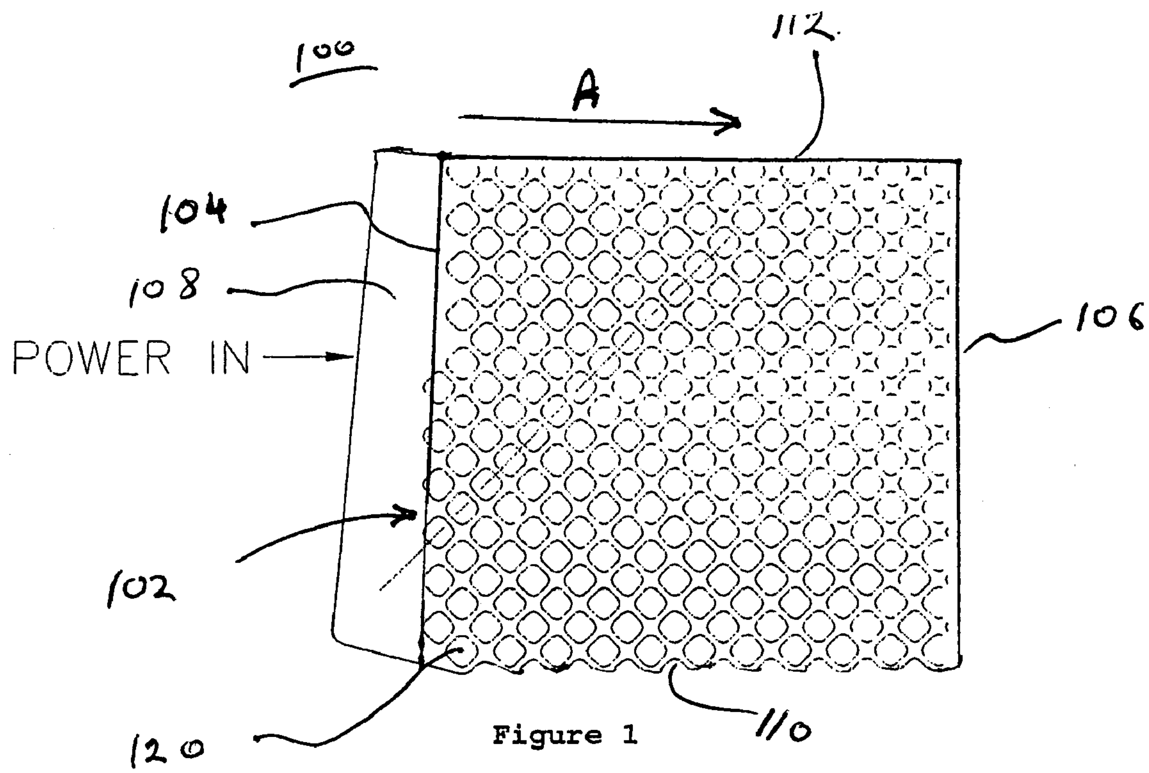
FIG. 1 is a first embodiment of a foil heating element in accordance with the present invention.

FIG. 1 shows a first embodiment of foil sheet electrical resistance heating element in accordance with the present invention. The foil sheet 100 has a first patterned region 102 provided with a plurality of holes 120. The first patterned region is defined by opposite first and second end portions, 104, 106, respectively. A first direction, indicated by the arrow A, is defined from the first end to the second end. The first patterned region is also bounded by lateral edges 110, 112, either or both of which need not be straight. The foil sheet 100 also has a first contact region 108 adjacent the first patterned region 104. The first contact region 108, which preferably is not patterned, provides the foil sheet 100 with an area to which electrical connection may be made, as indicated in the figure by the designation "Power In". A second contact region (not shown) may be provided adjacent the second end 106.

The presence of the holes 120 in the first patterned region 102 results in the creation of multiple electrical paths between the first end 104 and the second end 106. Furthermore, the holes 120 overlap one another in a direction transverse to the first direction A, such that the first patterned region 102 is devoid of continuous sections of foil material between the first and second ends 104, 106, a long a line parallel to said first direction. In other words, when viewed along the first direction, there is no straight-line path of foil material in areas away from the lateral edges 110, 112. This is because the holes are configured and dimensioned such that the multiple electrical paths in areas away from lateral edges of said first patterned region 102 are all non-parallel to said first direction A—the paths being forced to travel around the holes 120. Furthermore, as best seen FIG. 1, the holes 120 also overlap one another along the first direction A such that the first patterned region 102 is devoid of continuous sections of foil material that: (a) extend in straight lines between opposing lateral edges 110, 112 connecting the first and second ends 104, 106 and (b) are perpendicular to said first direction A.

In the embodiment of FIG. 1, the holes 120 are square-shaped and all holes have the same size. In addition, these holes 120 have rounded corners, which help minimize damage due to fatigue.

Figure 2:
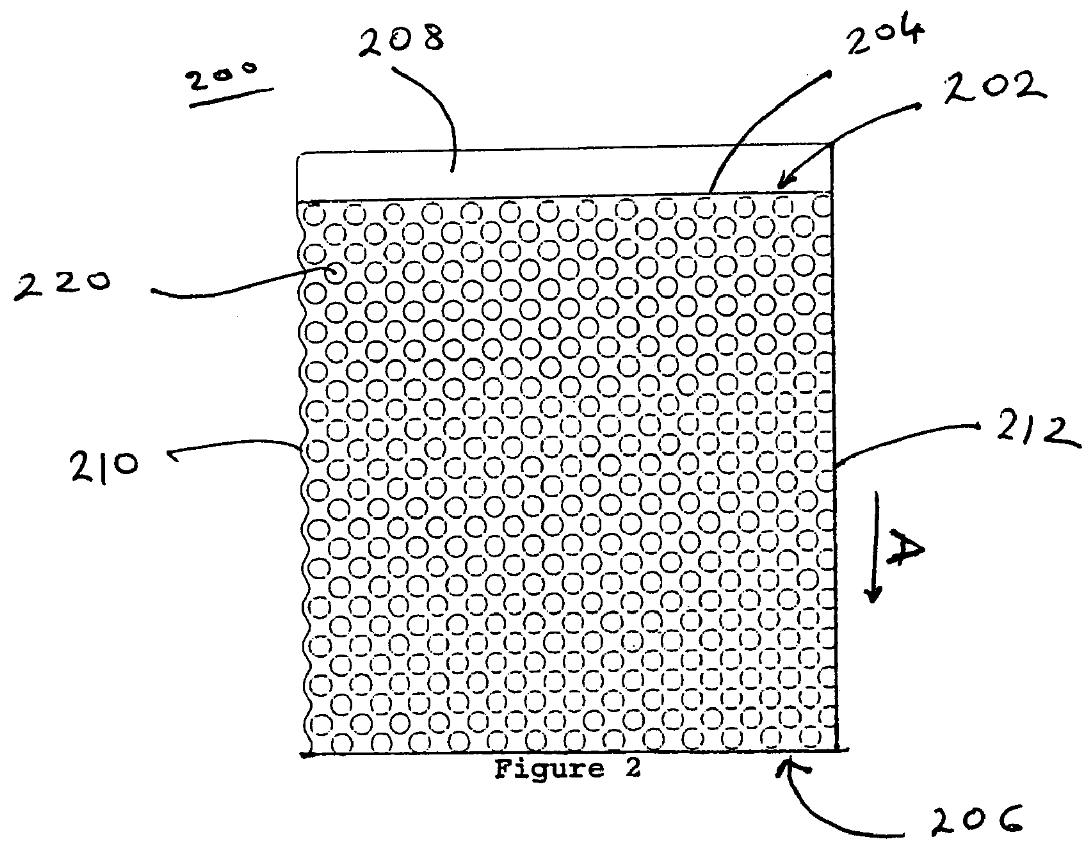
FIG. 2 is a second embodiment of a foil heating element in accordance with the present invention.

In FIG. 2, the foil sheet 200 similarly has a first patterned region 202 bounded by a first end 204, a second end 206, a first lateral edge 210 and a second lateral edge 212. A first contact region 208 is also provided. The holes 220 in the first patterned region 202 are circular in shape, but otherwise imbue the foil sheet 200 with the characteristics discussed above with respect to FIG. 1 regarding the creation of multiple electrical paths, overlap, line-of sight properties, etc.

Figure 3:
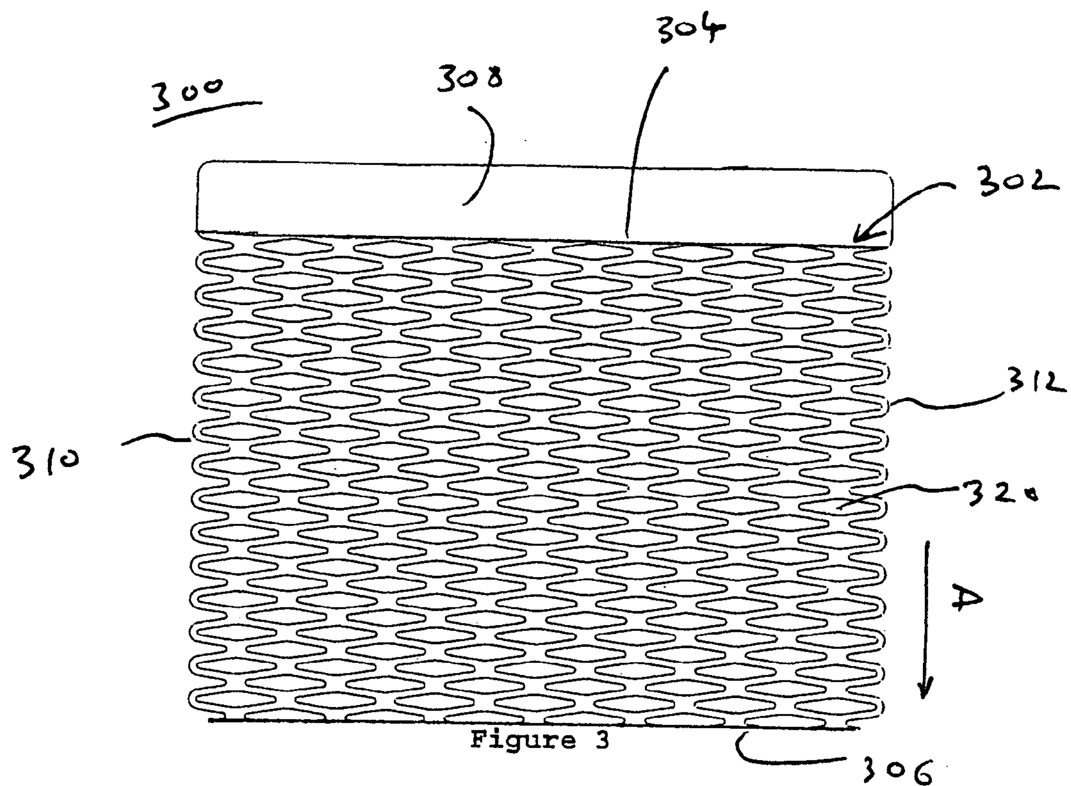
FIG. 3 is a third embodiment of a foil heating element in accordance with the present invention.

In FIG. 3, the foil sheet 300 has a first patterned region 302 bounded by a first end 304, a second end 306, a first lateral edge 310 and a second lateral edge 312. A first contact region 308 is also provided. The holes 320 in the first patterned region 302 are diamond shape with rounded edges and have the same size. It is further noted that a long dimension of the diamond is oriented transverse to the first direction A. The holes 320 imbue the foil sheet 300 with the characteristics discussed above with respect to FIG. 1 regarding the creation of multiple electrical paths, overlap, line-of sight properties, etc.

Figure 4:
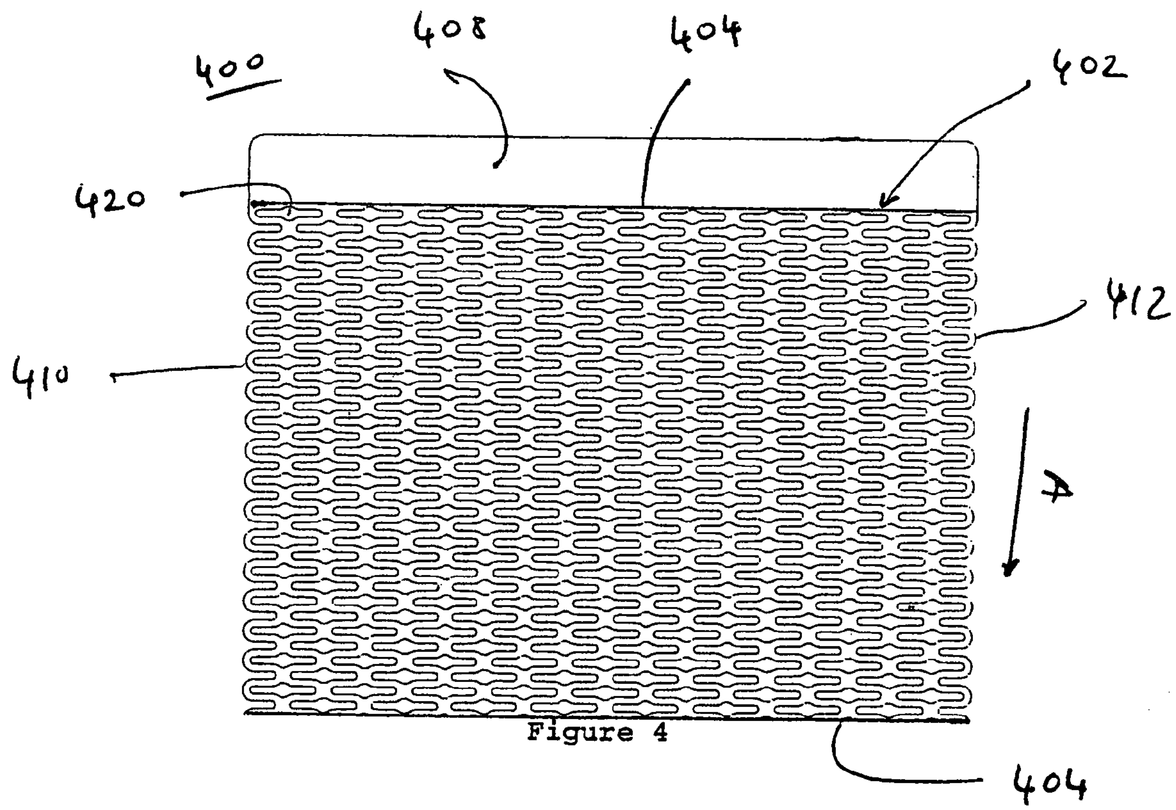
FIG. 4 is a fourth embodiment of a foil heating element in accordance with the present invention.

In FIG. 4, the foil sheet 400 has a first patterned region 402 bounded by a first end 404, a second end 406, a first lateral edge 410 and a second lateral edge 412. A first contact region 408 is also provided. The holes 420 in the first patterned region 402 are keyhole-shaped with rounded edges at the ends of the keyhole; the holes all have the same size in this embodiment. It is further noted that a long dimension of the keyhole-shaped holes is oriented transverse to the first direction A. The holes 420 imbue the foil sheet 400 with the characteristics discussed above with respect to FIG. 1 regarding the creation of multiple electrical paths, overlap, line-of sight properties, etc.

Figure 5:
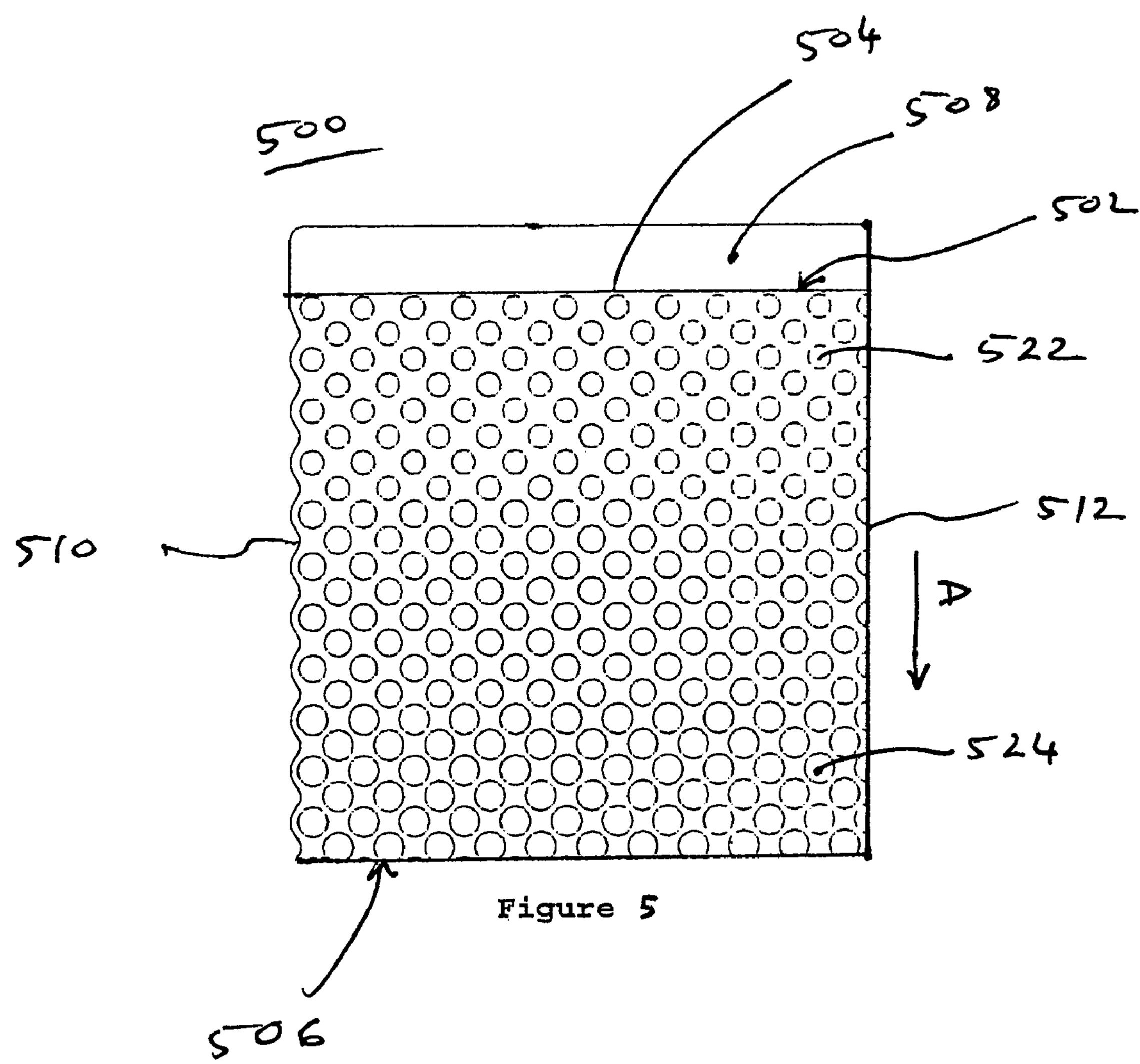
FIG. 5 is a fifth embodiment of a foil heating element in accordance with the present invention.

In FIG. 5, the foil sheet 500 has a first patterned region 502 bounded by a first end 504, a second end 506, a first lateral edge 510 and a second lateral edge 512. A first contact region 508 is also provided. In this embodiment, the holes are circular in shape. The holes 522 near the first end 504 are seen to be smaller than holes 524 near the second end 506. As a consequence, the cross-sectional width of portions of the foil sheet 500 between adjacent holes change along the first direction A. In particular, the holes are monotonically increasing in size from the first end 504 to the second end 506 and so the cross-sectional width of portions of the foil sheet 500 between adjacent holes monotonically decrease alone the first direction A. The holes imbue the foil sheet 500 with the characteristics discussed above with respect to FIG. 1 regarding the creation of multiple electrical paths, overlap, line-of sight properties, etc.

As shown in the exemplary embodiments of FIGS. 1-5, one aspect of the present invention starts with a metal foil which is patterned by a series of holes created by cutting, punching, chemically etching, and like processes, for example, to provide a more flexible heating element than currently available. In some applications, the resulting metal/hole pattern may be diagonally aligned to the flow of heating energy through the metal foil as shown in the embodiment of FIG. 1, for example. Depending on design requirements, the holes of such metal/hole patterns may be created in many different shapes as exemplified by these embodiments.

Figure 6:
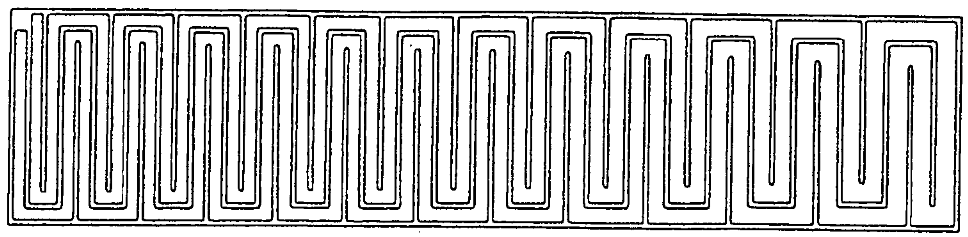
FIG. 6 is an embodiment of a prior art foil heating element.
Figure 7:
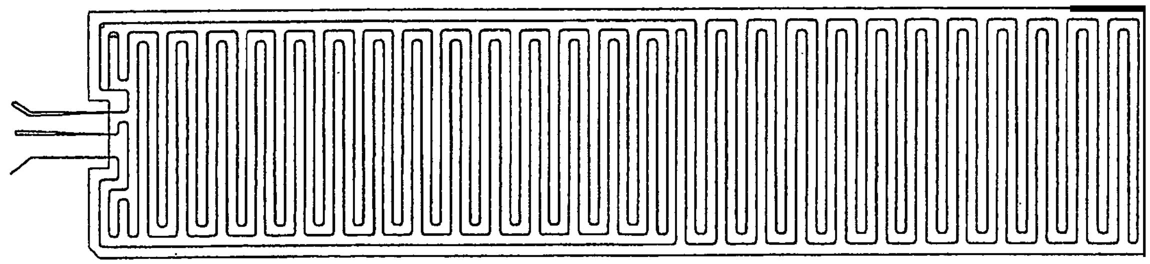
FIG. 7 is another embodiment of a prior art foil heating element.

The metal/hole patterns of the heating element embodiments described in connection with the embodiments of FIGS. 1-5 generate a robustness through their redundant circuitry, i.e. more ribbons (metal channels) than a typical current heaters 600, 700 and exemplified by FIGS. 6 and 7, respectively, which have a single metal channel (foil/wire) that is interconnected in both the x and y direction. In the present embodiments of metal foil heaters, a breakage of several arteries by FOD or fatigue, for example, will result in only a minimal degradation to heating element functionality.

The metal/hole foil pattern of the present embodiments may also be tailored to specific heat densities in local areas by chemically etching the metal ribbon surfaces (element thickness) or edges and/or by changing the size of the holes and ribbons as exemplified by the embodiment of foil sheet 500, depicted in FIG. 5, thus changing the metal volume (circular mil) of a given cross section of the heating element.

In this manner, the metal foil heating element of the present invention satisfies the desired characteristics of flexibility, robustness and designability to heat specific density patterns for most, if not all, applications of an electrothermal deicer system.

People skilled in the art know how to make and use electric heaters for aircraft de-icing applications, as exemplified by U.S. Pat. Nos. 5,475,204, 5,590,854, 6,027,075, 6,237,874 and 6,832,742, all of whose contents are incorporated by reference to the extent necessary to understand the present invention.

The above description of various embodiments of the invention is intended to describe and illustrate various aspects of the invention, and is not intended to limit the invention thereto. Persons of ordinary skill in the art will understand that certain modifications may be made to the described embodiments without departing from the invention. All such modifications are intended to be within the scope of the appended claims.

What is claimed is:

1. An aircraft electrothermal deicer heating element comprising:

a foil sheet having a first patterned region extending in a first direction from a first portion to a second portion, the first patterned region being provided with a plurality of holes defining multiple electrical paths extending from the first portion to the second portion, wherein:

the holes overlap one another such that the first patterned region is devoid of continuous sections of foil material that: (a) extend in straight lines between the first and second portions, and (b) are parallel to said first direction; and the holes overlap one another such that the first patterned region is devoid of continuous sections of foil material that: (a) extend in straight lines between opposing lateral edges connecting the first and second portions, and (b) are perpendicular to said first direction.

2. An aircraft electrothermal deicer heating element comprising:

a foil sheet having a first patterned region extending in a first direction from a first end to an opposite second end, the first patterned region being provided with a plurality of holes defining multiple electrical paths extending from the first end to the second end;

wherein:

the holes are configured and dimensioned such that said multiple electrical paths in areas away from lateral edges of said first patterned region are all non-parallel to said first direction;

the holes in the first patterned region have more than one size; and the cross-sectional width of portions of the foil sheet between adjacent holes change along the first direction.

3. The aircraft electrothermal deicer heating element according to claim 2, wherein hole size in the first patterned region varies monotonically along said first direction.

4. The aircraft electrothermal deicer heating element according to claim 3, wherein hole size in the first patterned region increases along said first direction.

5. The aircraft electrothermal deicer heating element according to claim 1, wherein all holes in said first patterned region have a same shape.

6. The aircraft electrothermal deicer heating element according to claim 1, wherein each of said plurality of holes has a rectangular shape with rounded corners.

7. The aircraft electrothermal deicer heating element according to claim 1, wherein each of said plurality of holes has a circular shape.

8. The aircraft electrothermal deicer heating element according to claim 1, wherein each of said plurality of holes has a diamond shape with rounded corners.

9. The aircraft electrothermal deicer heating element according to claim 1, wherein each of said plurality of holes has a keyhole shape with rounded ends.

10. The aircraft electrothermal deicer heating element according to claim 9, wherein the holes with a keyhole-shape have a long axis that is perpendicular to said first direction.

11. The aircraft electrothermal deicer heating element according to claim 2, wherein breakage of one of said multiple electrical paths by foreign object damage or fatigue will result in only a minimal degradation to heating element functionality.

12. The aircraft electrothermal deicer heating element according to claim 1, wherein hole size in the first patterned region varies monotonically along said first direction.

13. The aircraft electrothermal deicer heating element according to claim 1, wherein the holes are configured and dimensioned such that said multiple electrical paths in areas away from lateral edges of said first patterned region are non-parallel to said first direction.

14. An aircraft electrothermal deicer heating element comprising:

a foil sheet having a first patterned region extending in a first direction from a first portion that is connected to a power input to a second portion, the first patterned region being provided with a plurality of holes defining multiple electrical paths extending from the first portion to the second portion;

wherein:

the holes are configured and dimensioned such that said multiple electrical paths in areas away from lateral edges of said first patterned region are all non-parallel to said first direction; and the holes overlap one another such that the first patterned region is devoid of continuous sections of foil material that: (a) extend in straight lines between opposing lateral edges connecting the first and second portions, and (b) are perpendicular to said first direction.

15. The aircraft electrothermal deicer heating element according to claim 2, wherein:

the cross-sectional width of portions of the foil sheet between adjacent holes change monotonically along the first direction.

16. The aircraft electrothermal deicer heating element according to claim 15, wherein:

the cross-sectional width of portions of the foil sheet between adjacent holes monotonically decrease along the first direction.

17. The aircraft electrothermal deicer heating element according to claim 1, wherein:

the cross-sectional width of portions of the foil sheet between adjacent holes change monotonically along the first direction.

18. The aircraft electrothermal deicer heating element according to claim 17, wherein:

the cross-sectional width of portions of the foil sheet between adjacent holes monotonically decrease along the first direction.

19. The aircraft electrothermal deicer heating element according to claim 14, wherein:

the cross-sectional width of portions of the foil sheet between adjacent holes change monotonically along the first direction.

20. The aircraft electrothermal deicer heating element according to claim 19, wherein:

the cross-sectional width of portions of the foil sheet between adjacent holes monotonically decrease along the first direction.

* * * * *